United States Patent
Cerrina et al.

(10) Patent No.: US 7,157,229 B2
(45) Date of Patent: Jan. 2, 2007

(54) PREPATTERNED SUBSTRATE FOR OPTICAL SYNTHESIS OF DNA PROBES

(75) Inventors: Francesco Cerrina, Madison, WI (US); Wei Huang, Madison, WI (US)

(73) Assignee: NimbleGen Systems, Inc., Madison, WI (US)

( * ) Notice: Subject to any disclaimer, the term of this patent is extended or adjusted under 35 U.S.C. 154(b) by 553 days.

(21) Appl. No.: 10/279,200

(22) Filed: Oct. 23, 2002

(65) Prior Publication Data
US 2003/0143724 A1    Jul. 31, 2003

Related U.S. Application Data

(60) Provisional application No. 60/353,219, filed on Jan. 31, 2002.

(51) Int. Cl.
*C12Q 1/68*    (2006.01)
*C07H 21/04*    (2006.01)

(52) U.S. Cl. ........................ 435/6; 536/24.3; 536/24.33

(58) Field of Classification Search ............... None
See application file for complete search history.

(56) References Cited

U.S. PATENT DOCUMENTS 4,568,189 A * 2/1986 Bass et al. .................. 356/401
5,424,186 A * 6/1995 Fodor et al. .................... 435/6

\* cited by examiner

*Primary Examiner*—Young J. Kim
(74) *Attorney, Agent, or Firm*—Quarles & Brady LLP

(57) ABSTRACT

An optical alignment system for a device for synthesizing DNA polymers provides for a patterned substrate for simple alignment of the system. The substrate may also be used for synthesis allowing precise alignment of the synthesis substrate during each synthesis operation. The patterning of the substrate may be used to promote separation of reaction sites.

28 Claims, 3 Drawing Sheets

PREPATTERNED SUBSTRATE FOR OPTICAL SYNTHESIS OF DNA PROBES

CROSS REFERENCE TO RELATED APPLICATIONS

This application is based on provisional application 60/353,219 filed Jan. 31, 2002 and entitled "Method and Apparatus for Synthesis of Arrays of-DNA Probes" and claims the benefit thereof.

STATEMENT REGARDING FEDERALLY SPONSORED RESEARCH OR DEVELOPMENT

FIELD OF THE INVENTION

This invention pertains generally to the field of biology and particularly to techniques and apparatus for the manufacture of arrays of polymers useful in the analysis and sequencing of DNA and related polymers.

BACKGROUND OF THE INVENTION

The identification of DNA sequences is useful in the mapping of plant and animal genes as well as in other research and commercial applications.

One method of identifying DNA sequences uses an array of oligonucleotide probes constructed using photolithographic techniques. Each probe of the array is designed to hybridize with a particular DNA target, the latter of which may be coupled to a fluorescent target. By observing where the DNA hybridizes, the identity of the DNA may be deduced. This technique is described generally in Pease, et al., "Light-Generated Oligonucleotide Arrays for Rapid DNA Sequence Analysis," *Proc. Natl. Acad. Sci. USA*, 91:5022–5026 (May 1994).

The probes are constructed on a substrate coated with photolabile protecting groups. Exposure by light passing through a photolithographic mask causes certain locations on the substrate to become reactive. DNA monomers are washed over the substrate and attached at the reactive sites. The exposed ends of the monomers are also protected by a photolabile material which in turn may be made reactive by selective illumination.

This process may be repeated with different monomers or short oligomers until arbitrary DNA polymers are built up at the various reaction sites. By changing the photolithographic mask, different DNA sequences may be synthesized at different locations in the array.

Photolithographic masks are cumbersome and expensive. For this reason, in an alternative approach, an array of switchable optical elements such as a two-dimensional array of electronically addressable micro mirrors may be used instead of the masks. Projection optics focus an image of the micro mirrors on the substrate where the nucleotide addition reactions are conducted. Under the control of a computer, each of the micro mirrors is selectively switched between a first position at which it projects light on the substrate through the optical system and a second position at which it deflects light away from the substrate. The cost of the masks and the time consuming process of exchanging mask is eliminated Careful alignment of the masks or micro mirrors (henceforth collectively termed "pattern generator"), the projection optics, and the substrate is required for reliable high-density synthesis of DNA probes. This complex and time-consuming process may need to be repeated over time as the system is used. Complicating the alignment process is the extremely small size of the details in the projected image and the fact that the light energy is typically in the ultraviolet range.

BRIEF SUMMARY OF THE INVENTION

The present invention provides a simple and precise method of aligning the pattern generator, the projection optics, and the substrate by superimposing a projected image from the pattern generator on a prepatterned substrate or a substrate-like target. This alignment system makes it practical to align each substrate prior to synthesis and thereby allows the substrates to have alignment sensitive features, for example, reaction inhibiting materials positioned between reaction sites to provide for greater reaction spatial definition.

In one embodiment, the pattern on the substrate is one that creates a "moiré" pattern with the image of the pattern generator. Regular moiré patterns can produce an apparent magnification of alignment problems allowing alignment by unaided visual inspection. Alternatively, the moiré pattern may be used with electronic light sensors to provide automatic alignment. In an alternative embodiment, a prepatterned-target may be used and the alignment of the system performed in a separate step before synthesis operations at which time the target is replaced by a substrate.

It is thus one object of the invention to provide a simple mechanism for optical alignment of systems for DNA probe synthesis. It is another object of the invention to allow precise alignment of the substrate such as allows the substrate to incorporate alignment sensitive features.

Further objects, features, and advantages of the invention will be apparent from the following detailed description when taken in conjunction with the accompanying drawings.

DETAILED DESCRIPTION OF THE PREFERRED EMBODIMENT

Figure 1:
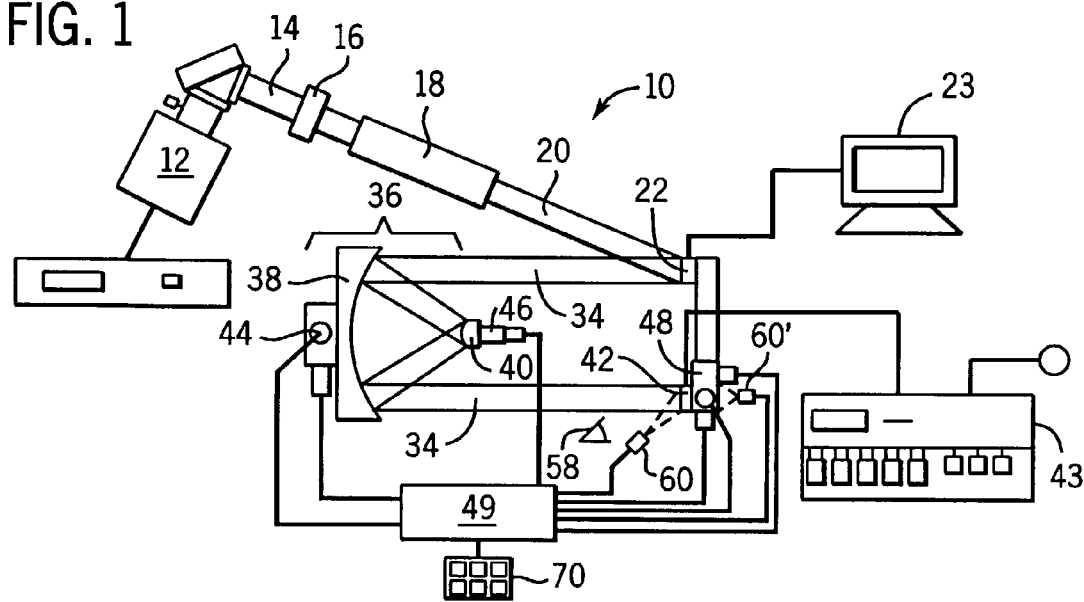
FIG. 1 is a block diagram of an optical system for DNA probe synthesis suitable for use in the present invention, the optical system providing reflective optics projecting an image of a micro mirror array onto a substrate, showing servo controlled optical mountings allowing alignment of these components according to visual inspection or signals from electronic light sensors.

Referring now to FIG. 1, a DNA synthesis device 10 includes a light source 12, typically being a mercury arc lamp or the like, but alternatively including lasers, solid state, and gas discharge sources to produce an ultraviolet or near ultraviolet source beam 14. The beam 14 may be passed through a filter 16 selected to pass only the desired wavelengths (e.g., the 365 nanometer mercury line). Other devices for filtering or monochromating the light source e.g., diffraction gratings, dichroic mirrors, and prisms may also be used rather than a filter and are generically referred to as "filters" herein.

The filtered beam 14 is received by a condenser system 18 forming a uniform beam 20 of specified divergence. The divergence (or conveyance angle is such to satisfy the requirement of spatial coherence of the illumination typically σ=0.7. A number of standard optical devices may be used including, for example, a prismatic/kaleidoscopic collimator such as that described in co-pending application Ser. No. 60/353,491 filed Jan. 31, 2002, and assigned to the same assignee as the present invention and hereby incorporated by reference.

The illumination beam 20 strikes a pattern generator which imposes a pattern of light and dark areas on the illumination beam. In the preferred embodiment, the pattern generator is an array of micro mirrors, which is described in detail immediately below. Other types of pattern generators include static devices such as conventional photolithographic masks and reflective targets, and dynamic devices such as micro shutters, micro mirrors operated by bimorph piezoelectric actuators, LCD shutters, and reflective LCD devices.

Figure 2:
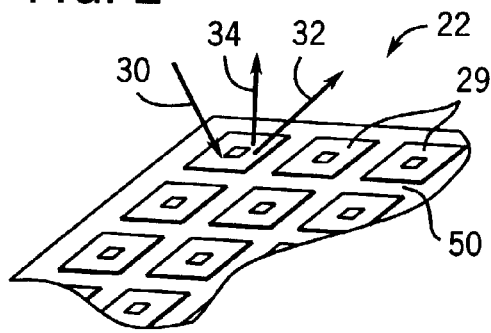
FIG. 2 is a fragmentary perspective view of the surface of the micro mirror array showing individual mirrors separated by lanes and showing incident light and two directions of reflection for one mirror depending on the state of the mirror.

Referring also to FIG. 2, as mentioned in the preferred embodiment, the pattern generator is an array 22 of micro mirrors 29, each micro mirror 29 being substantially square, but not limited to edges of ten to twenty micrometers. The micro mirrors 29 are arranged in the array 22 in rows and columns and are available in various sizes including, but not limited to 640×800, 640×840, 800×600, 1024×768, and 1024×1260. Each micro mirror 29 is capable of reflecting the light in the normal usable wavelengths including ultraviolet and near ultraviolet light in an efficient manner without damaging itself.

Generally, the array 22 of micro mirrors 29 may be the Digital Light Processor (DLP) commercially available from Texas Instruments, Inc. Such arrays are discussed in the following article and patents: Larry J. Hornbeck, "Digital Light Processing and MEMs: Reflecting the Digital Display Needs of the Networked Society," SPIE/EOS European Symposium on Lasers, Optics, and Vision for Productivity and Manufacturing 1, Besancon, France, Jun. 10–14, 1996; and U.S. Pat. Nos. 5,096,279, 5,535,047, 5,583,688 and 5,600,383, hereby incorporated by reference.

Each micro mirror 29 is operable independently, under electronic control such as from the output of a general-purpose digital computer 23, to deflect along its diagonal over a range of approximately 10–12°, thus causing a deflection of 20-40° in the light. In this way, the micro mirrors 29 are capable of imparting a pattern of light and dark squares onto the collimated beam 20 Specifically, and referring still to FIG. 2, incident ray 30 (of the collimated beam 20) arrives at the micro mirrors 29 at an angle of approximately 20° with respect to a normal to the plane of the array 22. "Absorbed" rays 32 will be reflected from the micro mirrors 29 in a first position of the micro mirrors 29 (e.g., minus 10° with respect to the plane of the array 22) and directed out of the system to an absorber (not shown). Projected rays 34 are reflected from the micro mirrors 29 in a second position (e.g., plus 10° with respect to the plane of the array 22) toward a telecentric projection system 36. The micro mirrors 29 are separated by generally non reflecting lanes 50.

The projection system 36 is comprised of a concave spherical mirror 38 and an opposed convex mirror 40. Both mirrors 38 and 40 are preferably spherical although aspherical shapes are possible as well. The mirrors 38 and 40 have enhanced UV coating for high reflectivity. The beam formed from projected rays 34 from the array 22 is received by one side of mirror 38 and reflected to mirror 40 which in turn reflects the beam 34 to the other side of mirror 38 from which it is directed to the active surface of a glass substrate enclosed in a flow cell 42. The mirrors 38 and 40 are focused to produce an image of the array 22 of micro mirrors 29 within the flow cell 42.

In the preferred embodiment, the concave mirror 38 may have a diameter of 152.4 millimeters and a spherical mirror surface radius of 304.8 millimeters and the convex mirror may have a diameter of 25 millimeters and a spherical mirror radius of 152.94 millimeters. Ideally, the radius of curvature of the concave mirror is close to twice that of the convex mirror. Such reflective optical systems are well known and conventionally used in optical lithography in "MicroAlign" type systems. See, e.g., A. Offner, "New Concepts in Projection Mask Aligners," *Optical Engineering*, Vol. 14, pp. 130–132 (1975), and R. T. Kerth, et al., "Excimer Laser Projection Lithography on a Full-Field Scanning Projection System," *IEEE Electron Device Letters*, Vol. EDL-7(5), pp. 299–301 (1986), hereby incorporated by reference.

The mirror 38 may be mounted on an XY table 44 for moving the mirror 38 in two perpendicular directions perpendicular to the mirror's radius of symmetry. The XY table 44 may be motorized, with motors communicating with a motor controller 49 to be described below or may be movable manually by means of vernier screws. In the preferred embodiment, mirror 38 is mounted in a tilt stage capable of precise rotations in the two directions perpendicular to the mirror axis. These rotations provide precise alignment and location of the image.

Similarly, mirror 40 may be mounted on a focus stage 46 having a motor or screw adjustment for moving mirror 40 toward and away from mirror 38 for focusing purposes. If motorized, the motor communicates with motor controller 49 which may perform automatic adjustments of these motor controlled movements or may accept manual input via keypad 70 providing, for example, a constant velocity motion of any axis when a corresponding button is pressed.

The flow cell 42 may be mounted on an $XY_\phi$ table 48 or similar positioning device for moving the flow cell 42 in either or both of two perpendicular directions perpendicular to the axis of the beam 34 and to rotate the flow cell 42 about the axis of the beam 34. Again, these movements may be motorized with the motors communicating with the controller 49 as will be described, or may be manually adjustable as will be described. The flow cell is connected to a supply of basic DNA monomers or polymers from a reagent supply system 43 of a type well known in the art.

Figure 3:
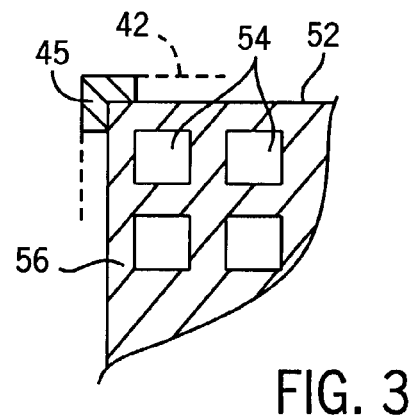
FIG. 3 is a plan view of a pre-patterned substrate or target showing target regions and separation regions corresponding to the mirrors and lanes, respectively, of FIG. 2 with the separation regions treated for increased reflection.

Referring to FIGS. 1 and 3, the projection system 36 will project an image of the micro mirrors 29 on a planar substrate 52 contained within the flow cell 42 as registered by mechanical guides 45. The image (not shown) will have bright portions corresponding to the areas of the mirrors 29 when those micro mirrors 29 are reflecting light along the normal to the array 22 of micro mirrors 29 and dark portions corresponding to the mirrors 29 that are tipped to direct light to an absorber. Lanes 50 between mirrors will generally be dark.

The substrate 52 may provide the reaction site for DNA synthesis or may be a target for alignment purposes only (henceforth also referred to as substrate 52) includes "reaction sites" 54 corresponding to regions where the images of the micro mirrors 29 may be formed and "reaction separation areas" 56 corresponding to regions where the images of the lanes 50 may be formed. The surface of the substrate 52 of the reaction separation areas 56 may be patterned to cause reduced light propagation at a given direction than the reaction separation regions 56. In this case, the term propagation should be understood to mean generally the quality of directing light along an arbitrarily defined detection direction and thus should include reflection, refraction, diffraction, and transmission.

Referring again to FIG. 1, the light propagated by reaction separation areas 56 and reaction sites 54 may be received either by a viewer 58 or an appropriately placed light sensor 60 or 60' (which could for example be a photoelectric cell, or a camera and/or image processing circuitry, or the like) where location of sensor 60 indicates a detection of reflected or scattered light and sensor 60' indicates a detection of transmitted light. The electronic sensors 60 also communicate with controller 49 as will be described.

Figure 4:
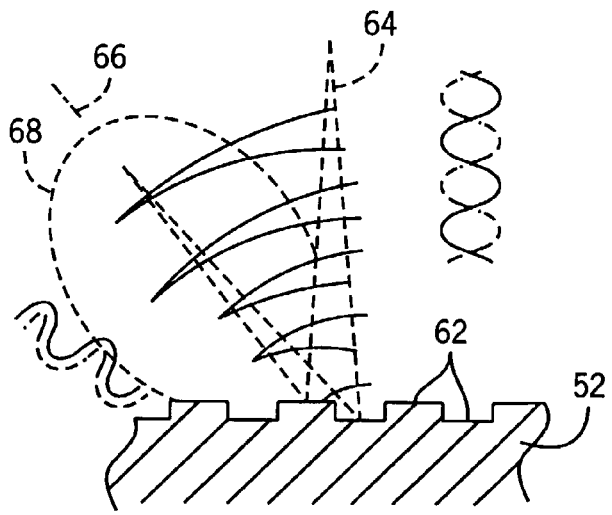
FIG. 4 is a figure similar to that of FIG. 3 showing target regions treated for increased reflection.
Figure 4:
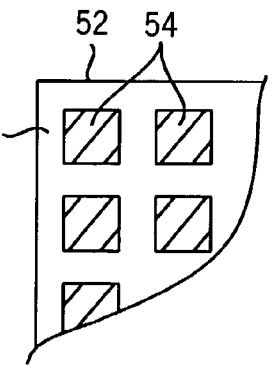

Referring now to FIG. 4, an alternative substrate 52 may be used having a pattern providing greater propagation in the reaction separation areas 56 and lesser propagation in the reaction sites 54 may also be produced.

These variations in propagation may be produced by a variety of means including, but not limited to, a coating process coating an opaque, absorptive or reflective material in various regions or by a diffraction process in which lines are ruled in the surfaces of the substrate 52 to provide for a desired selective reflectivity.

Figure 5:
FIG. 5 is a schematic cross-section through the pre-patterned substrates or target of FIGS. 3 and 4 showing a method of providing increased reflection at a specific angle through the use of an optical grating.

Referring now to FIG. 5, in this latter case, an optical grating 62 may be ruled in the surface of the substrate 52 in regions where selective reflection is desired. The grating 62 provides for grooves and ridges separated in a direction normal to the surface of the substrate 52 by one-half wavelength of the incident light. Light reflected from this ruled surface from the grooves and ridges will destructively interfere along an axis 64 perpendicular to the surface of the substrate 52. Whereas at an angled axis 66, the light from the grooves and ridges will constructively add providing a reflectivity profile 68 that is maximum at off-axis angles. Thus light to an eye 58 or sensor 60 for detecting reflection off-axis may be maximized.

The propagated light may be used to align the substrate 52 with the image of the micro mirrors 29 through microscopic examination of differences in the locations of reaction sites 54 and in the superimposed image of the micro mirrors 29. More simply, however, a moiré interference pattern may be observed in which macroscopic interference features are generated by the periodicity of the overlapping image in the reaction sites 54.

Figure 6:
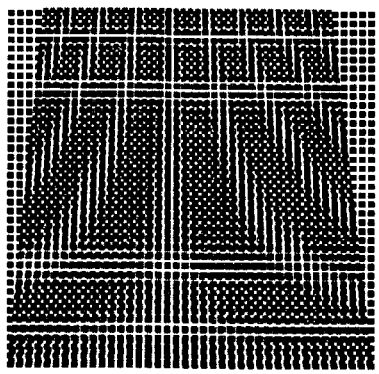
FIG. 6 is a moiré pattern generated by a superposition of an image of the mirror array of FIG. 2 and the pattern of FIG. 3 showing an optical misalignment such as produces "keystone" distortion in the projected image.

Referring now to FIG. 6, a keystone distortion of the image such as shortens (in this example) a top edge of the array image with respect to the pattern of FIGS. 3 and 4 produces a set of inwardly curving moiré fringes such as would be visible to the naked eye. Such keystone distortion can be caused by a substrate 52 lying in a plane that is not parallel to the array 22 of micro mirror 29, and is minimized by the telecentric optics of the present invention, but may be at issue in other optical projection systems. The substrate 52 may be tipped appropriately through shims or adjustments, the like to correct this distortion.

Figure 7:
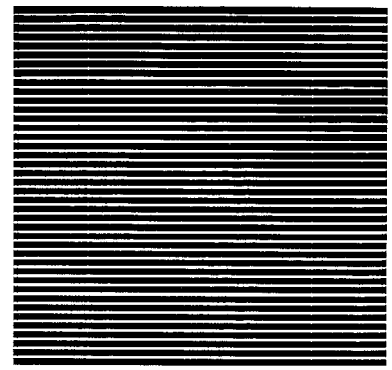
FIG. 7 is a figure similar to that of FIG. 6 showing an optical misalignment such as produces a left-right in-plane offset in the projected image.

Referring now to FIG. 7, an XY misalignment of the substrate 52 with respect to the image (in this case leftward offset) will create a set of horizontal bands reducing the total light propagated. This variation in total light may be detected visually and manual adjustment made, or may be detected by sensors 60 and used as an input to controller 49 to maximize (or minimize) propagated light and thereby correct for such displacement.

Figure 11:
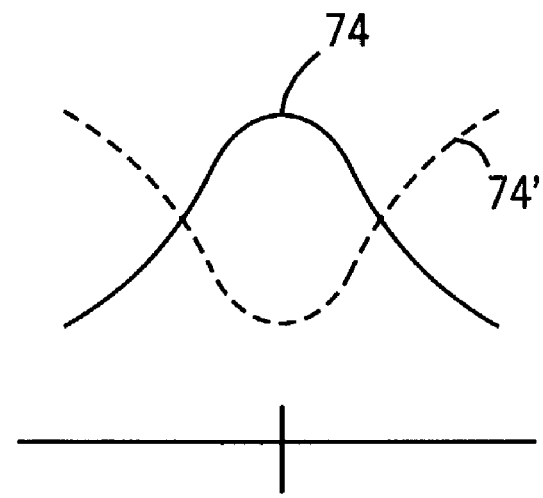
FIG. 11 is a plot showing variation in one axis of misalignment versus light intensity from the moiré pattern such as forms the basis for automatic alignment of the optical system of FIG. 1.

Referring to FIG. 11, the total light propagated from the substrate of FIG. 3 from the pattern of FIG. 7 is shown plotted against x-axis displacement in a solid line (light function 74) and the total light for the substrate of FIG. 4 is shown as a dotted line (light function 74'). The controller 49 following a maximizing (or minimizing) rule can thus automatically correct for x or y-axis displacement between the substrate 52 and the image of the array 22. Such algorithms, well known in the art, make small perturbations in the controlled axis (e.g. x) and detect whether there has been an increase or decrease in the measured quality (propagation of light) and then move an increment in a direction that improves the measured quality, repeating this process until a peak or valley is found. A similar approach can be used to correct for y-axis displacement. Generally, but not shown, lack of focus may also affect the amount of light propagated. Thus, lack of focus can be corrected using a similar peak (or valley) automated correction mechanism.

Figure 8:
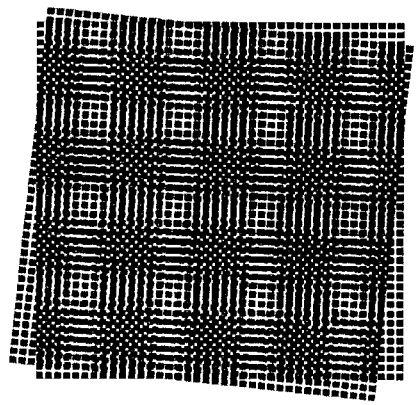
FIG. 8 is a figure similar to that of FIG. 6 showing an optical misalignment such as produces a relative rotation in the projected image.

Referring now to FIG. 8, a rotation of the substrate 52 with respect to the image creates a tipped cross of interference patterns and can be corrected by rotation of the substrate until the cross disappears.

Figure 9:
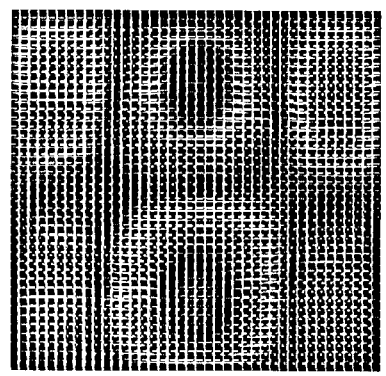
FIG. 9 is a figure similar to that of FIG. 6, showing an optical misalignment such as produces a "barrel" distortion in the projected image.

Referring to FIG. 9, a warping of the image (pincushion or barrel distortion) is manifest by circular zones of interference fringes.

Figure 10:
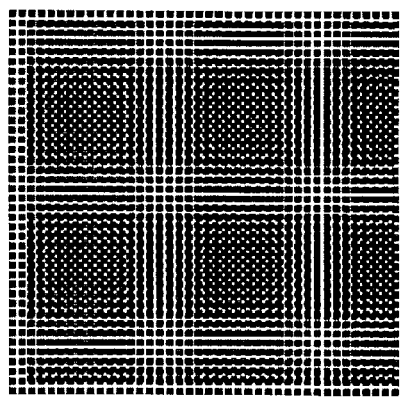
FIG. 10 is an image similar to that of FIG. 6 showing a misalignment such as produces over magnification of the projected image.

Referring to FIG. 10, magnification errors may also be detected by the presence of virtual magnified images of reaction sites 54. An elimination of these magnification regions to produce an essentially uniform gray field indicates a 1-to-1 magnification.

The target may be treated with a fluorescent material or backed by fluorescent material to make the measurements of these distortions apparent to the naked eye. In this way, as mentioned, a human operator may control a set of axis controls 70 attached to the controller 49 to manually move the optical elements of mirror 38, 40 and $XY_\phi$ table 48 appropriately based on understanding of the patterns of FIGS. 6 through 10. Alternatively, certain of these adjustments may be made automatically by the controller 49 attempting to minimize a light function 74' or maximize a light function 74 received from sensor 60 or 60' based on a variation of a parameter 76 which may be one of the dimensions of distortion. For example, correction of magnification may attempt to minimize function 74 as a function of position of mirror 40 along its axis. Such servo control techniques are well known in the art. Alternatively, more sophisticated machine recognition systems may be used to mimic that of a human operator observing the moiré patterns for multi-axis correction.

Figure 12:
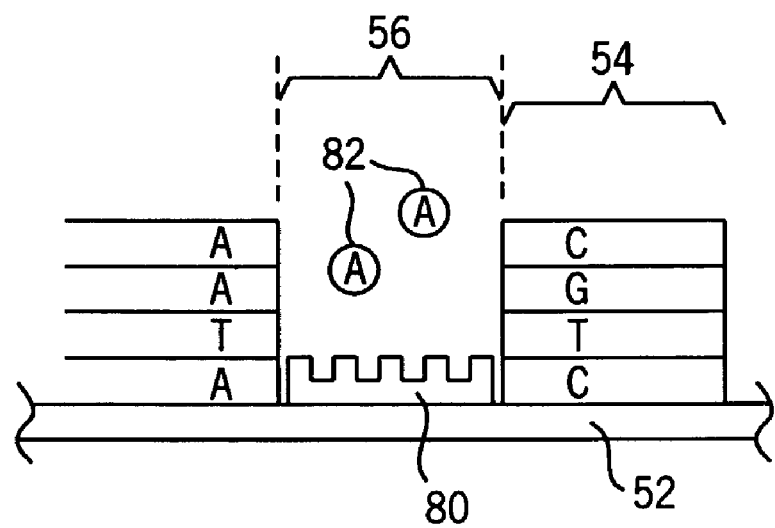
FIG. 12 is a cross-sectional fragmentary view of a substrate having synthesized DNA polymers and showing an intervening lane having a rejection surface for preventing synthesis in the lane region.

Referring now to FIG. 12, the ability to accurately locate the substrate 52 allows it to be pre-patterned not simply for the purpose of alignment but to allow the pattern to do double duty in the synthesis process. For example, the substrate 52 may include a topical coating 80, such as a repellant coating, positioned in the reaction separation areas 56 so as to reject the bonding of the monomers 82 except in reaction sites 54 providing greater contrast between reaction sites and other sites.

It is specifically intended that the present invention not be limited to the embodiments and illustrations contained herein, but that modified forms of those embodiments including portions of the embodiments and combinations of elements of different embodiments also be included as come within the scope of the following claims. For example, although the flow cell 42 is moved in the preferred embodiment, the micro mirror array 22 may be moved to equal effect. Further, the substrate, as mentioned, may be a target fit into the flow cell, used for alignment, and then replaced by a substrate for DNA synthesis on the substrate.

We claim:

1. A DNA synthesis apparatus comprising:
    (a) a reactor providing a pre-patterned substrate presenting an array of spatially separated reaction sites at which nucleotide addition reactions may be conducted;
    (b) a light source providing a light capable of promoting nucleotide addition reactions;
    (c) a pattern generator positioned along an optical path between the light source and the reactor to receive the light and impress a pattern on the light having illuminated portions corresponding to a subset of the separated reaction sites of the prepatterned substrate, the pattern generator being a set of electronically addressable micro mirrors positioned along the optical path between the light source and the reactor to receive and reflect the light; and
    (d) projection optics projecting the pattern of light on the prepatterned substrate so that the illuminated portions align with the reaction sites.

2. The apparatus of claim 1 further including an alignment means adjusting the relative location of at least two of the: projection optics, the pattern generator, and the substrate.

3. The apparatus of claim 2 further including a light sensor receiving light from the prepatterned substrate to control the adjustment of the relative locations of at least two of: the projection optics, the pattern generator, and the substrate.

4. The apparatus of claim 1 including an alignment means allowing manual adjustment of the relative location of at least two of the projection optics, the pattern generator, and the substrate to correct for misalignment between the array of spatially separated reaction sites of the pre-patterned substrate and the illuminated portions of the light pattern.

5. The apparatus of claim 1 wherein prepatterned substrate reproduces an image of at least a portion of the light pattern to provide for a moiré pattern when illuminated with the light pattern.

6. The apparatus of claim 1 wherein the image of the electronically addressable micro mirrors includes mirror regions and lane regions and the prepatterned substrate includes reaction sites corresponding to the mirror regions and reaction separation areas corresponding to the lanes.

7. The apparatus of claim 1 wherein there are reaction separation areas between the reaction sites and the reaction separation areas have been treated to provide for lesser light reflection than the reaction sites.

8. The apparatus of claim 7 wherein the reaction separation areas are treated to provide for greater light reflection than the reaction sites.

9. The apparatus of claim 8 wherein the reaction separation areas are ruled with a grid providing an angled reflection.

10. The apparatus of claim 1 wherein the reaction separation area is treated to inhibit nucleotide addition reactions in the reaction separation area.

11. A DNA synthesis apparatus comprising:
    (a) a reactor providing a support for a substrate presenting an array of spatially separated reaction sites at which nucleotide addition reactions may be conducted;
    (b) a light source providing a light capable of promoting nucleotide addition reactions;
    (c) a pattern generator positioned along an optical path between the light source and the reactor to receive the light and impress a pattern on the light, wherein the pattern generator is a set of electronically addressable micro mirrors positioned along an optical path between the light source and the target to receive and reflect the light;
    (d) projection optics projecting an image of the pattern at an image plane;
    (e) an alignment target positionable at the image plane, the target having a pattern providing a moiré pattern.

12. The apparatus of claim 11 further including an alignment means dynamically adjusting the relative location of at least two of the: projection optics, the pattern generator, and the target.

13. The apparatus of claim 11 further including a light sensor receiving light from the target to control the adjustment of the relative locations of at least two of: the projection optics, the pattern generator, and the target.

14. The apparatus of claim 11 including an alignment means allowing manual adjustment of the relative location of at least two of the projection optics, the pattern generator, and the target to correct for misalignment between the target and the light pattern.

15. The apparatus of claim 11 wherein the image of the electronically addressable micro mirrors includes mirror regions and lane regions and the target includes target regions corresponding to the mirror regions and separation areas corresponding to the lanes.

16. The apparatus of claim 15 wherein the target is treated so that separation areas provide for greater light reflection than the target regions.

17. The apparatus of claim 15 wherein the target is treated so that the separation areas provide for lesser light reflection than the target regions.

18. The apparatus of claim 15 wherein the reaction separation areas are ruled with a grid providing an angled reflection.

19. The apparatus of claim 15 wherein the target areas are ruled with a grid providing an angled reflection.

20. A method of DNA synthesis comprising the steps of:
(a) positioning a prepatterned substrate presenting an array of spatially separated reaction sites at which nucleotide addition reactions may be conducted in a reactor;
(b) providing a light source capable of promoting nucleotide addition reactions; and
(c) projecting a pattern of light having illuminated portions corresponding to a subset of the separated reaction sites on the prepatterned substrate so that the illuminated portions align with the reaction sites, wherein the pattern of the prepatterned substrate reproduces an image of a set of electronically addressable micro mirrors having mirror regions and lane regions and the pattern of the prepatterned substrate includes reaction sites corresponding to the mirror regions and reaction separation areas corresponding to the lanes.

21. The method of claim 20 further including the step of adjusting the relative location of the pattern of light on the prepatterned substrate.

22. The method of claim 21 further including the step of detecting light emanating from the prepatterned substrate to control the adjustment of the relative location of the pattern of light on the prepatterned substrate.

23. The method of claim 20 further including the step of manually adjusting the pattern of light to correct for distortion.

24. The method of claim 20 wherein the pattern of the prepatterned substrate reproduces an image of at least a portion of the light pattern to provide for a moiré interference pattern when illuminated with the light pattern.

25. The method of claim 20 including the step of treating the reaction separation areas to provide for lesser light reflection than the reaction sites.

26. The method of claim 25 including the step of treating the reaction separation areas to provide for greater light reflection than the reaction sites.

27. The method of claim 25 including the step of ruling the reaction separation areas with a grid providing an angled reflection.

28. The method of claim 20 including the step of treating the reaction separation areas to inhibit nucleotide addition reactions in the reaction separation areas.

* * * * *